United States Patent Office 2,995,027
Patented Aug. 8, 1961

2,995,027
PROCESS FOR DETERMINING THE WETTABILITY OF RESERVOIR ROCKS
George G. Bernard and Orrin C. Holbrook, Crystal Lake, Ill., assignors to The Pure Oil Company, Chicago, Ill., a corporation of Ohio
No Drawing. Filed Aug. 5, 1957, Ser. No. 676,380
20 Claims. (Cl. 73—38)

This invention relates to a method for determining the wettability of reservoir rocks. It is more specifically concerned with establishing the fractional, preferential, water-wettable, surface area in natural reservoir rocks.

According to this invention the degree of water and/or oil wettability of subterranean, geological, oil-bearing, rock-reservoirs can be determined by investigating the affinity of core samples of the rock for water- and/or oil-soluble adsorbates such as dye solutions, etc.

The phenomena of capillarity and surface tension are important factors in determining the efficiency of recovery processes wherein water- or gas-drives are employed to effect the recovery of oil from oil-bearing reservoirs. The interfacial tension relationships that exist between the various phases in the reservoir have considerable influence in determining whether a rock reservoir surface has a superior attraction for water in comparison with that which it has for oil. In most petroleum reservoirs both oil-wet and water-wet rock surfaces occur with surfaces that are water-wettable predominating. It is quite possible, however, for both conditions to exist within a reservoir.

Information regarding both the type and degree of wettability is of value in the formulation and development of plans for the recovery of residual oil from partially depleted, subterranean, oil-bearing, geological formations. For example, the wettability characteristics of a rock reservoir permit determining the relative position of the residual oil in the reservoir. If the reservoir sands or surfaces are oil-wet, the residual oil is in the wetting phase. Also, rocks which are oleophilic and hydrophobic do not respond to secondary recovery processes employing water floods. It is possible, however, to modify the interfacial tension relationships that exist within the rock reservoir by the addition of a surface-active agent which creates a greater affinity between water and oil than between the rock surfaces and oil. The type of surface-active agent depends on a number of factors, including the type of formation, the amount and type varying with the wettability condition within the formation.

Wettability means the extent to which a solid is wetted by a particular liquid and indicates the preference of a given liquid to spread over a solid surface in the presence of a second liquid. A number of experimental techniques have been developed for determining the wettability of rock surfaces. For plane surfaces, the relative wettability can be determined by the well-known contact-angle technique. Because of the geometrical complexity of rock reservoir surfaces, however, this technique cannot be used with reliability to state what the preferential wettability is. Accordingly, to measure the relative wettability of rock reservoirs it is necessary to employ samples obtained by the coring of the reservoir being investigated. Several techniques including relative-permeability data and capillary-pressure data have been developed for measuring the preferential wettability of rock reservoirs. It has been shown that reservoir rocks exhibit varying degrees of adhesion attraction with reference to the liquid phases which are present in the reservoir. The above-mentioned techniques are not suitable for measuring this fractional wettability. There has been developed a technique for determining and measuring the degrees and types of wettability by changing the magnetic "environment" of atomic nuclei in the rock reservoir. Although this technique is effective, it requires special procedures and equipment which complicate the determination of the fractional wettability. According to the instant invention, however, fractional wettability can be determined with facility by employing an adsorption technique. It has been found that the adsorptive capacity of a rock reservoir for various types of adsorbates can be correlated with the degree of water and/or oil wettability of a particular formation.

It is, therefore, the primary object of this invention to determine and measure the degree of water and/or oil wettability of reservoir rocks. It is another object of this invention to measure the fractional differences in oil or water wettability of reservoir rock to facilitate evaluating the use of secondary recovery processes employing water-flood for recovering oil from partially depleted, oil-bearing reservoirs. It is another object of this invention to correlate the adsorptive capacity of a rock reservoir with the fractional wettability of the formation. These and other objects will become more apparent from the following detailed description of this invention.

In accordance with this invention, the ratio of water-wet to oil-wet surface area within a geological formation can be determined by obtaining from the formation a core sample of suitable size. This core sample is contacted with a water solution of a water-soluble adsorbate, either by passing the solution through the core, or by crushing the core sample and agitating the comminuted particles in contact with the solution. It is known that clays and cementing material constitute over 90% of the surface area of consolidated formations. It is also known that if a liquid containing an adsorbate, such as a dye or surface-active agent, is passed through a core taken from such a formation, the clays and cementing materials adsorb some of the adsorbate from the liquid according to the adsorptive capacity of the clays and cementing material. In accordance with this invention, this characteristic of the clays and cementing material to adsorb certain substances from a solution is employed for determining quantitatively the percent of surface area of a core that is water-wet and the percentage of the surface area that is oil-wet. If a solution of an adsorbate does not come in contact with the clay surfaces, or if the clay surfaces are not wet by the solution, the adsorbate will not remain on the clay surfaces. In other words, if a core containing both water and oil is 100% water wet, upon passing a mineral oil solution of an oil-soluble adsorbate through the core in contact with the clay surfaces none of the adsorbate will remain. If, however, an aqueous solution of a water-soluble adsorbate is passed through the core, the adsorbate is adsorbed from the water until the adsorptive capacity is satisfied. Conversely, if a core containing both oil and water is 100% oil-wet and a mineral oil solution of an oil-soluble adsorbate is passed through the core, the adsorbate is adsorbed until the capacity of the clay is satisfied. If an aqueous solution of a water-soluble dye were passed through this oil-wet core none of the adsorbate would be adsorbed because the water would not contact the clay surfaces. In a core of intermediate wettability, both water and oil-soluble adsorbates are adsorbed in proportion to the ratio of the water-wet surfaces to the oil-wet surfaces. Therefore, by contacting a core sample with a given quantity of an aqueous solution of a water-soluble adsorbate, and subsequently with the same quantity of a mineral oil solution of an oil-soluble adsorbate, and observing the diminution in the concentration of the respective adsorbates in the effluent recovered from the contacting, it is possible to determine qualitatively whether a core is water-wet, oil-wet or of intermediate wettability.

This technique can also be made quantitative by selecting matched water and oil-soluble adsorbates which have the same adsorptive characteristics, whereby the same unit amount of each type of adsorbate per unit surface area is adsorbed. The weight of water- and oil-soluble adsorbate adsorbed is determined in order to obtain the ratio of the weight of water-soluble adsorbate adsorbed to the weight of oil-soluble adsorbate adsorbed. This ratio under these conditions will equal the ratio of water-wet surfaces to oil-wet surfaces in the reservoir rock. Any standard analytical method can be used to determine the amounts of adsorbate in the in-put and out-put stream to ascertain the amount of adsorbate retained on the surfaces of the reservoir rock.

Although the foregoing technique can be employed with facility in determining the fractional wettability of rock reservoirs using an aqueous solution of a water-soluble adsorbate and a mineral oil solution of an oil soluble adsorbate, it is preferred that the subject invention be carried out by utilizing a manipulative technique in which only an aqueous solution of a water-soluble adsorbate is employed. In accordance with the preferred embodiment of this invention, a core sample removed from the reservoir being evaluated is contacted with an aqueous solution of a water-soluble adsorbate, either by passing the adsorbate solution through the core or by crushing the core sample and admixing the comminuted particles with the solution. The contacting is continued until the adsorptive capacity of the core for the adsorbate has been satiated as evidenced by the unchanging concentration of the adsorbate in the effluent recovered. The amount of adsorbate retained by the rock reservoir sample is then obtained by conventional quantitative analytical techniques.

Any oil which is contained in the rock sample is then extracted by contacting the sample with a solvent such as toluene, chloroform, carbon tetrachloride or other similar solvents for oil. After the oil has been removed from the sample by contacting the sample with a sufficient amount of solvent, the residual solvent retained by the sample is recovered and the core is saturated with water to remove any entrained air which would influence the relative permeability characteristics of the sample. Thereafter, the sample is again contacted with the aqueous adsorbate solution in the same manner as was employed in the initial step. Because the extraction removes the oil present during the first contacting step, the surface that was originally wetted by oil is now susceptible to water wetting. Accordingly, this newly exposed surface of the sample will retain quantities of the adsorbate up to the adsorptive capacity of this area. The amount of adsorbate adsorbed in this step is determined in the same manner as was employed in the initial contacting step before the extraction of oil from the core. A comparison of the amounts of dye adsorbed in the first and second contacting steps gives a quantitative evaluation of the water-wet surface area to the oil-wet surface area in the reservoir under study. If the alternative procedure of this embodiment is used, wherein the core is crushed prior to being contacted with the dye solution, the percolation procedure is similar to that described above except that the comminuted rock is contacted with successive increments of dye solution and then drained until no change occurs in the concentration of adsorbate in the effluent.

To illustrate the quantitative nature of the instant invention, tests were made on loose mixtures of different proportions of water-wet and oil-wet, 250-mesh, Ottawa sand. A sand, saturated with water, was considered to be 100% water wet. Sand which was treated with a 5% solution of a chlorosilane water-proofing agent in hexane, oven-dried at 250% F. for one hour and saturated with a petroleum mineral oil (Soltrol) was considered to be 100% oil wet. Mixtures of different proportions of the above sands, saturated with their respective wetting fluids, were prepared as shown in Table I. The weight of water-wet sand in each mixture was kept constant to insure that the equilibrium dye concentration for each of the mixtures would be roughly the same. This was done to assure that the quilibrium dye concentration in each sand-dye mixture fell at about the same point on the adsorption isotherm. Each of the sand mixtures was shaken with 25 cc. of 0.01% aqueous methylene blue solution for 30 minutes, then centrifuged and the dye concentration was determined. The results were expressed as mg. dye adsorbed/g. dry sand. The fractional wettability was determined by dividing the adsorption capacity of each sample by the adsorption capacity of the 100% water-wet sample.

The light transmittancy of the solution was determined in a Cenco-Sheard-Sanford Type B-2 Photelometer and the dye concentration was determined from a calibration curve.

TABLE I

*Tests on mixtures of water-wet and oil-wet 250-mesh sand*

| Sample No. | Dry Weight of Sand, g. | | | Percent Water-Wet Sand in Mixture | mg. Dye Adsorbed, g. Sample | Fractional Wettability by Dye Test [1] |
|---|---|---|---|---|---|---|
| | Water Wet | Oil Wet | Total | | | |
| 1 | 2 | 0 | 2 | 100 | 0.45 | 1.00 |
| 2 | 2 | 0.67 | 2.67 | 75 | 0.337 | 0.75 |
| 3 | 2 | 2 | 4.0 | 50 | 0.231 | 0.51 |
| 4 | 2 | 6 | 8 | 25 | 0.112 | 0.25 |
| 5 | 0 | 10 | 10 | 0 | 0.00 | 0.00 |

[1] Adsorption capacity of sample/adsorption capacity of 100% water wet sample.

From the results of these tests it is seen that there is perfect correlation between the dye adsorption capacities and the known proportion of water-wet sand in the mix. This technique, then, furnishes a quantitative method for determining the proportion of water-wet surface or fractional wettability of the reservoir sand being treated.

The following procedure was employed for applying the process of this invention to the determination of the fractional wettability of fresh field cores. Two adjacent 1" x 1" samples were drilled parallel to the bedding plane from each fresh field core. The adsorption capacity of one of these samples was determined by passing the dye solution through the freshly drilled sample which had received no treatment prior to testing. The resultant adsorption capacity in mg. dye/g. of plug was proportional to surface area of the plug contacted by the aqueous dye solution. The other plug was extracted with a mixture of chloroform and methanol, and saturated with its native brine which made the plug completely water wet. After allowing time for the clays to rehydrate, the adsorption capacity of the sample was determined. This plug being completely wet by the dye solution, the adsorption capacity would be proportional to its total exposed surface area. Division of the adsorption capacity of the fresh plug by the adsorption capacity of the extracted plug gave the fraction of the surface of the fresh plug that was water wet, i.e., fractional wettability.

To further illustrate the instant invention, the wettability test was performed on a number of fresh samples from different geological formations. Two adjacent 1" x 1" cores were cut from each sample. One core was extracted for about 16 hours in a mixture of three parts chloroform to one part methanol. This core was then saturated with a synthetic formation water and allowed to soak in this water for 24 hours. This treatment makes the core 100% water-wet. The dye adsorption capacity of both cores was determined in the following manner: The core was mounted in a conventional core-holder and a 0.01% solution of methylene blue in 0.5% $CaCl_2$ solution was passed through the core. The effluent was collected in 10 pore-volume increments and the color and dye concentration of each increment was determined as described above. This was continued until the dye concentration in the effluent was 95% of the concentration of the injected solution. The weight (in mg.) of dye absorbed was determined by graphically integrating the curve of effluent dye concentration vs. cc. dye through.

The results are expressed as mg. dye adsorbed/gram of core. Typical results on fresh cores are shown in Table II.

TABLE II

| Core—Description | mg. dye adsorbed, g. sample | | Percent Water-Wet |
|---|---|---|---|
| | Fresh | Water-Wet | |
| Wyoming | 0.12 | 0.83 | 14.5 |
| California | 0.40 | 0.58 | 69 |
| Colorado | 0.42 | 0.55 | 76 |
| Berea sandstone saturated with water and then driven to irreducible water with oil | 0.62 | 0.62 | 100 |

Although it is preferred that a dye material be employed as the adsorbate in carrying out the process of this invention, any other adsorbable material which can be conveniently and easily quantitatively analyzed can be employed. Suitable adsorbates include but are not limited to surface-active agents, the degree of adsorption of which can be evaluated by means of surface tension relationships; solutions of radioactive-chemicals which can be measured employing conventional radioactivity mounting devices; dyes which can be measured colorimetrically; and other adsorbates. Because of the ease with which quantitive measurements can be made employing colorimetric methods, this analytical technique can be used with a variety of adsorbable reagents. In this regard reference is made to Colorimetric Methods of Analysis, F. D. Snell, et al.,, 3rd ed., Van Nostrand, 1948–1954.

If the preferred expedient is employed, a number of water-soluble dyes are available for use in this invention which include crystal violet, malachite green, safranine "O," fuchsin, safranine "Y," aniline yellow, butter yellow, Bismarck brown, chrysodine and others. When the alternative embodiment utilizing oil-soluble dyes is used, suitable materials include Sudan I, Amide Azo Benzol Oil Red OS, Monolite Red B, Orange II, Naphthylamine Bordeaux, Azosol Fast Red and others.

The concentration of dye which is employed will depend mainly upon the dye adsorptive capacity of the rock reservoir being investigated. Accordingly, the desired concentration should be determined experimentally by contacting reservoir samples with solutions of varying concentrations to determine the most efficacious solution to employ. In general, however, the amount of adsorbate employed will vary between about 0.0001% by weight to about 0.1% by weight. It is preferred, however, that concentrations within the range of 0.01 to 0.1% by weight be employed. Distilled water can be used or the aqueous solvent can be modified to preclude the swelling of the clay constituents of the core sample by the addition of suitable electrolytes, e.g., sodium chloride, calcium chloride, etc. In order to determine the amount of adsorbate which remains on the core surfaces, conventional analytical techniques can be employed. Because of the convenience of colorimetric techniques wherein a colored solution of unknown concentration is compared visually with a standard of known concentration value to determine the unknown concentration, colorimetric methods of analysis are preferred, as noted above.

Types of adsorbates not adaptable for analysis by colorimetric methods will of course require the use of quantitative analytical techniques which are suitable for use in determining unknown concentrations of the selected adsorbate. The selection of suitable adsorbates and appropriate, rapid, quantitative analytical methods will be apparent to those skilled in the art.

In addition to the analytical techniques described above, other adjuncts used in carrying out the instant invention involve the utilization of conventional equipment which is readily available from a variety of sources. In obtaining the cores which are used in the quantitative techniques of this invention, coring techniques such as those described by H. L. Landua in "Subsurface Geologic Methods" Leroy, Colorado School of Mines, page 609, et seq. can be used. The core sizes which are obtained will depend upon the characteristics of the coring equipment which is used. In general, it is preferred to use cores having a diameter of greater than about 2½ inches in order that two smaller core samples 1 inch in diameter can be obtained. Core lengths of about 1 inch to about 3 inches should also be used to obtain representative reservoir samples. If the embodiment of the invention wherein a comminuted core is used should be preferred, the core samples should be disintegrated to provide a 10 to 100 mesh sample. In leaching the reservoir samples to remove the residual oil, chloroform, carbon tetrachloride, benzene, toluene, or other suitable solvent is used and the sample repeatedly washed or leached. In a preferred method, a mixture of 3 parts of chloroform and 1 part of methanol or benzene is used as the extraction. A Soxhlet extraction apparatus can be used for this purpose, or a small bowl-type centrifuge can be employed. In leaching the oil from the core sample care must be taken to avoid removal of the adsorbate initially adsorbed by the interstitial surfaces. This can be done by the proper selection of a dye which is not affected by the oil solvent employed. In the alternative, two core samples can be used as described in the illustrative embodiment. After washing or leaching, the sample should be thoroughly dried, preferably by heating for a time at a temperature at less than about 210° F. in a suitable oven. It is important that the core or comminuted core samples not be subjected to temperatures in excess of about 250° F. to avoid deleteriously affecting the adsorptive characteristics of the reservoir samples. When a core sample is being evaluated, the apparatus employed for forcing the adsorbate solution through the pore spaces of the reservoir rock sample can be a modified permeameter which is adapted to pass the liquid solutions through the core sample. In this apparatus the core is held in a suitable core-holder such as that described in the art, and a flow system is designed to pass the adsorbate solution at a rate of flow of about 0.1 to 10.0 millimeters per second per square centimeter of cross-sectional area through it. A suitable receiver is provided in order to receive the effluent which is passed through the core. Commercial types of permeameters which can be modified for use in carrying out the process of this invention are available. It is apparent, however, that the design and construction of suitable flow apparatus for passing the adsorbate solution through the rock reservoir can be made by those skilled in the art to which this invention pertains.

The instant invention is adaptable for use in evaluating the fractional wettability of both limestone and sandstone cores. It is, therefore, apparent from the foregoing detailed description of this invention that there is provided by means of this invention a technique for determining and measuring the type and degree of wettability of rock reservoir. Various modifications in the process of this invention will be suggested by the complete specific embodiment herein presented which can be made without departing from the scope of this invention. Accordingly it is intended that the subject invention be limited only in the manner defined in the appended claims.

We claim as our invention:

1. A method for determining the fractional preferential water-wet and oil-wet surface areas in a rock reservoir which comprises passing a first aqueous solution of a water-soluble adsorbate capable of being adsorbed by said rock through a sample specimen of said rock reservoir without increasing the volume of any clayey constituent contained in said specimen until there is effected the substantially complete saturation of the water-wettable surfaces of said specimen with said adsorbate, determining the amount of said adsorbate adsorbed by said specimen, treating a specimen of said rock whereby said treated specimen is made substantially completely water-wettable without affecting the adsorptive characteristics thereof, thereafter passing a second aqueous solution of a water-soluble adsorbate through said treated specimen without increasing the volume of any clayey constituent contained therein until there is effected the substantially complete saturation of the freshly made, water-wettable surfaces of said treated specimen with said adsorbate, determining the amount of said adsorbate adsorbed by said surfaces, each of said adsorbates having substantially the same adsorptive characteristics so that the same unit amount of each adsorbate per unit of rock reservoir area is adsorbed, whereby the fractional oil and water-wettability of said rock can be determined by correlating the amount of first adsorbate adsorbed with the amount of second adsorbate adsorbed.

2. A method in accordance with claim 1 in which the same adsorbate is employed in said first and second solutions.

3. A method in accordance with claim 2 in which said adsorbate is a water-soluble dye.

4. Method in accordance with claim 1 in which the specimen is treated to make it completely water-wettable by leaching it with a volatile oil solvent, drying the leached specimen at elevated temperature but below that at which the adsorption properties of the specimen are deleteriously affected and saturating the dried sample with adsorbate-free aqueous solution.

5. Method in accordance with claim 4 in which the adsorbate is methylene blue in concentration of about 0.0001 to 0.1% by weight of the aqueous solution.

6. A method for determining the fractional preferential water-wet and oil-wet surface areas in a rock reservoir which comprises passing a first aqueous solution of a water-soluble adsorbate capable of being adsorbed by said rock through a sample specimen of said rock reservoir without increasing the volume of any clayey constituent contained in said specimen until there is effected the substantially complete saturation of the water-wettable surfaces of said specimen with said adsorbate, determining the amount of said adsorbate adsorbed by said specimen, treating a specimen of said rock to make it substantially completely water-wettable without affecting the adsorptive characteristics thereof, removing any air occluded within the interstitial passages of said treated specimen, thereafter passing a second aqueous solution of a water-soluble adsorbate through said treated specimen without increasing the volume of any clayey constituent contained in said treated specimen until there is effected the substantially complete saturation of the freshly made, water-wettable surfaces thereof with said adsorbate, determining the amount of said adsorbate adsorbed by said surfaces, each of said adsorbates having substantially the same adsorptive characteristics so that the same unit amount of each adsorbate per unit of rock reservoir area is adsorbed, whereby the fractional water and oil-wettability of said rock can be determined by correlating the amount of first adsorbate adsorbed with the amount of second adsorbate adsorbed.

7. A method for determining the fractional preferential water-wet and oil-wet surface areas in a rock reservoir which comprises passing a first aqueous solution of a water-soluble adsorbate capable of being adsorbed by said rock through a sample specimen of said rock reservoir without increasing the volume of any clayey constituent contained in said specimen until there is effected the substanially complete saturation of the water-wettable surfaces of said specimen with said adsorbate, determining the amount of said adsorbate adsorbed by said specimen, treating a specimen of said rock with a solvent for mineral oil, whereby said treated specimen is made substantially completely water-wettable without affecting the amount of said adsorbate retained by said treated specimen, removing any residual solvent from said treated specimen, saturating said treated specimen with an adsorbate-free, aqueous solution without increasing the volume of the clayey constituents thereof, thereafter passing a second aqueous solution of a water-soluble adsorbate through said treated specimen without increasing the volume of any clayey consituent contained therein until there is effected the substantially complete saturation of the freshly made, water-wettable surfaces of said specimen with said adsorbate, determining the amount of said adsorbate adsorbed by said surfaces, each of said adsorbates having substantially the same adsorptive characteristics so that the same unit amount of each adsorbate per unit of rock reservoir area is adsorbed, whereby the water and oil-wettability of said rock can be determined by correlating the amount of first adsorbate adsorbed with the amount of second adsorbate adsorbed.

8. A method in accordance with claim 7 in which said first and second adsorbate is a water-soluble dye.

9. A method in accordance with claim 8 in which said dye is methylene blue.

10. A method for determining the fractional preferential water-wet and oil-wet surface areas in a rock reservoir which comprises passing a first aqueous solution of a water-soluble adsorbate capable of being adsorbed by said rock through a first sample specimen of said rock reservoir without increasing the volume of any clayey constituent contained in said specimen until there is effected the substantially complete saturation of the water-wettable surfaces of said specimen with said adsorbate, determining the amount of said adsorbate adsorbed by said specimen, treating a second sample specimen of said rock reservoir whereby said specimen is made substantially completely water-wettable without deleteriously affecting the adsorptive characterisics thereof, thereafter passing a second aqueous solution of a water-soluble adsorbate through said specimen without increasing the volume of any clayey constituent contained in said specimen until there is effected the substantially complete saturation of the water-wettable surfaces of said specimen with said adsorbate, determining the amount of said adsorbate adsorbed by said surfaces, each of said adsorbates having substantially the same adsorptive characteristics so that the same unit amount of each adsorbate per unit of rock reservoir area is adsorbed, whereby the water and oil-wettability of said rock can be determined by correlating the amount of first adsorbate adsorbed with the amount of second adsorbate adsorbed.

11. A method in accordance with claim 10 in which the same adsorbate is employed in said first and second solutions.

12. A method in accordance with claim 11 in which said adsorbate is a water-soluble dye.

13. A method for determining the fractional preferential water-wet and oil-wet surface areas in a rock reservoir which comprises passing a first aqueous solution of a water-soluble adsorbate capable of being adsorbed by said rock through a sample specimen of said rock reservoir without increasing the volume of any clayey constituent contained in said specimen until there is effected the substantially complete saturation of the water-wettable surfaces of said specimen with said adsorbate, determining the amount of said adsorbate adsorbed by said specimen, treating a second sample specimen of said rock reservoir whereby said specimen is made substantially completely water-wettable without deleteriously affecting the adsorptive characteristics thereof, removing any air occluded within the interstitial passages of said specimen, thereafter passing a second aqueous solution of a water-soluble adsorbate through said specimen without increasing the volume of any clayey constituent contained in said specimen until there is effected the substantially complete saturation of the water-wettable surfaces of said specimen with said adsorbate, determining he amount of said adsorbate adsorbed by said surfaces, each of said adsorbates having substantially the same adsorptive characteristics so that the same unit amount of each adsorbate per unit of rock reservoir area is adsorbed, whereby the fractional oil and water-wettability of said rock can be determined by correlating the amount of first adsorbate adsorbed with the amount of second adsorbate adsorbed.

14. A method for determining the fractional preferential water-wet and oil-wet surface areas in a rock reservoir which comprises passing an aqueous solution of an adsorbate capable of being adsorbed by said rock through a sample specimen of said rock reservoir without increasing the volume of any clayey constituent contained in said specimen until there is effected the substantially complete saturation of the water-wettable surfaces of said specimen with said adsorbate, determining the amount of said adsorbate adsorbed by said specimen, treating a second sample specimen of said rock reservoir with a solvent for mineral oil, removing any residual solvent from said specimen, saturating said specimen with an adsorbate-free, aqueous salt solution without increasing the volume of the clayey constituents of said specimen whereby said specimen is made substantially completely water-wettable, thereafter passing a second aqueous solution of a water-soluble adsorbate through said specimen without increasing the volume of any clayey constituent contained in said specimen until there is effected the substantially complete saturation of the water-wettable surfaces of said specimen with said adsorbate, determining the amount of said adsorbate adsorbed by said surfaces, each of said adsorbates having substantially the same adsorptive characteristics so that the same unit amount of each adsorbate per unit of rock reservoir area is adsorbed, whereby the fractional oil and water-wettability of the rock can be determined by correlating the amount of first adsorbate adsorbed with the amount of second adsorbate adsorbed.

15. A method in accordance with claim 14 in which said first and second adsorbate is a water-soluble dye.

16. A method in accordance with claim 15 in which said dye is methylene blue.

17. The method of determining relative oil-wettability and water-wettability of subterranean petroleum rock reservoirs comprising intimately contacting a specimen of said rock with a known quantity of aqueous solution of water-soluble adsorbate capable of being adsorbed by said rock, determining the amount of adsorbate adsorbed, contacting said specimen with a known quantity of a mineral oil solution of an oil-soluble adsorbate having substantially the same adsorptive characteristics as said first mentioned adsorbate and determining the amount of adsorbate adsorbed, and comparing the amount of adsorbate adsorbed from the aqueous and oil solutions.

18. The method of determining the percentage of oil-wettability of rock comprising intimately contacting an untreated specimen of said rock with a petroleum oil solution of an oil-soluble adsorbate capable of being adsorbed by said rock until the rock is saturated with said adsorbate, determining the amount of adsorbate adsorbed, treating a specimen of said rock to make it completely oil-wettable, intimately contacting said treated specimen with a petroleum oil solution of the same adsorbate until it is saturated with said adsorbate, determining amount of adsorbate adsorbed by the treated specimen whereby the percentage of oil-wettability of said rock can be determined by correlating the amount of adsorbate adsorbed by the untreated and treated specimens.

19. Method in accordance with claim 18 in which the specimen is treated to make it completely oil-wettable by contacting it with a hexane solution of chloro-silane, drying it and saturating the dried specimen with petroleum oil.

20. Method in accordance with claim 18 in which the oil-soluble adsorbate is a dye.

References Cited in the file of this patent

UNITED STATES PATENTS

| | | |
|---|---|---|
| 2,269,569 | Williams | Jan. 13, 1942 |
| 2,348,639 | O'Brien | May 9, 1944 |
| 2,445,494 | Redmond | July 20, 1948 |
| 2,693,104 | Welge et al. | Nov. 2, 1954 |